United States Patent [19]

Kumasaka et al.

[11] Patent Number: 4,508,569
[45] Date of Patent: Apr. 2, 1985

[54] SEALING COMPOUND FOR CANS

[75] Inventors: Hideo Kumasaka, Yokosuka; Kazuo Fujisawa, Kawasaki, both of Japan

[73] Assignee: Toyo Seikan Kaisha, Ltd., Tokyo, Japan

[21] Appl. No.: 539,224

[22] Filed: Oct. 6, 1983

Related U.S. Application Data

[62] Division of Ser. No. 354,547, Mar. 4, 1982, abandoned.

[30] Foreign Application Priority Data

Mar. 10, 1981 [JP]  Japan .................................. 56-33137

[51] Int. Cl.³ ............................................... C04B 9/02
[52] U.S. Cl. ............................... 106/14.12; 106/14.21; 524/414; 524/417; 524/710; 524/724; 220/67
[58] Field of Search ............... 524/414, 417, 710, 724; 106/14.12, 14.21; 220/67

[56] References Cited

U.S. PATENT DOCUMENTS

| 3,586,519 | 6/1971 | Hendricks | 106/14.12 |
| 4,017,450 | 4/1977 | Bailey | 528/373 |
| 4,098,720 | 7/1978 | Hwa | 106/14.14 |

FOREIGN PATENT DOCUMENTS 865969 7/1978 Belgium .
7170 1/1980 European Pat. Off. .

Primary Examiner—A. Lionel Clingman
Assistant Examiner—Amelia B. Yarbrough
Attorney, Agent, or Firm—Sherman & Shalloway

[57] ABSTRACT

Disclosed is a sealing compound for cans, which is applied to the periphery of a can end member to seal the double-seamed portion between the can end member and a can body, said sealing compound comprising as a base component an aqueous latex of a styrene-butadiene rubber containing as a particle size-adjusting agent an alkali metal carbonate or an alkali metal salt of a phosphorus oxyacid in an amount of 0.3 to 2.0 parts by weight per 100 parts by weight of solids of the styrene-butadiene rubber.

9 Claims, 2 Drawing Figures

SEALING COMPOUND FOR CANS

This application is a division of application Ser. No. 354,547, filed Mar. 4, 1982, now abandoned.

BACKGROUND OF THE INVENTION (1) Field of the Invention

The present invention relates to a sealing compound for cans. More particularly, the present invention relates to a sealing compound for cans, which can effectively prevent rusting on the metal-exposed surface of the cut edge of a can end member.

(2) Description of the Prior Art

In the conventional process for the manufacture of cans, as shown in FIG. 1, a liquid sealing composition called "sealing compound" is lined in an annular groove 2 of a can end member (can lid) 1, and a sealing compound layer (gasket) 3 is thus formed, if necessary, by drying. Then, the can end member 1 is double-seamed to a flange of a can body 5, as shown in FIG. 2, to form a can. This sealing compound comprises as the main ingredient an aqueous latex of a styrene-butadiene rubber (SBR), and a composition formed by adding a tackifier, a filler, an emulsifier or a dispersant, a thickening agent and the like to this aqueous latex is ordinarily used for the manufacture of cans.

It has been found that when this known aqueous sealing compound is used, rusting often takes place on the cut edge 4 of the can end member 1. Since a surface-treated steel plate such as a tin-plated steel plate (tin-plate) or a chromic acid electrolytically treated steel plate (tin-free steel plate) is used as the can end member, occurrence of rusting on the surface to which the sealing compound is directly applied is prevented because of the presence of the covering layer, but in the above-mentioned cut edge 4, the steel substrate is exposed and the aqueous sealing compound adheres to this steel-exposed portion to cause rusting. If rusting takes place on the cut edge 4 of the can end member 1, when the can end member 1 is double-seamed to a can body filled with the content, rusts are separated and incorporated into the content to degrade the flavor and taste of the content, and furthermore, filiform corrosions are formed on the double-seamed portion to impair the appearance of the can.

SUMMARY OF THE INVENTION

As the result of our researches made on the causes of rusting on the cut edge of the can end member, we also found that an electrolyte, such as sodium chloride, which is incorporated into an aqueous latex of a styrene-butadiene rubber used as the base component of the aqueous sealing compound so as to adjust the particle size of the rubber particles, causes the above-mentioned rusting and when an alkali metal carbonate or an alkali metal salt of a phosphorus oxyacid is used as such electrolyte, occurrence of rusting on the cut edge of the can end member can be prevented effectively.

We have now completed the present invention based on this finding.

More specifically, in accordance with the present invention, there is provided a sealing compound for cans, which is applied to the periphery of a can end member to seal the double-sealed portion between the can end member and a can body, said sealing compound comprising as a base component an aqueous latex of a styrene-butadiene rubber containing as a particle size-adjusting agent an alkali metal carbonate or an alkali metal salt of a phosphorus oxyacid in an amount of 0.3 to 2.0 parts by weight per 100 parts by weight of solids of the styrene-butadiene rubber.

DETAILED DESCRIPTION OF THE PREFERRED EMBODIMENTS

Figure 1:
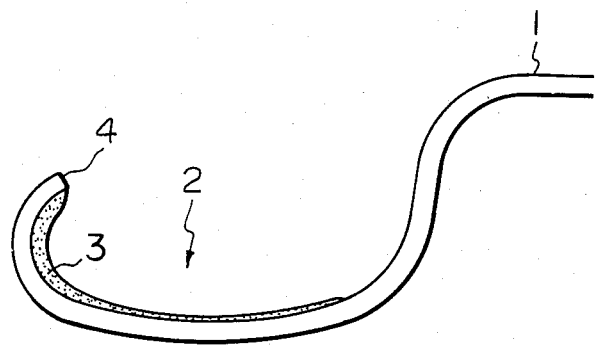
FIG. 1 is a sectional view showing the state of application of a sealing compound to a groove of a can end member.
Figure 2:
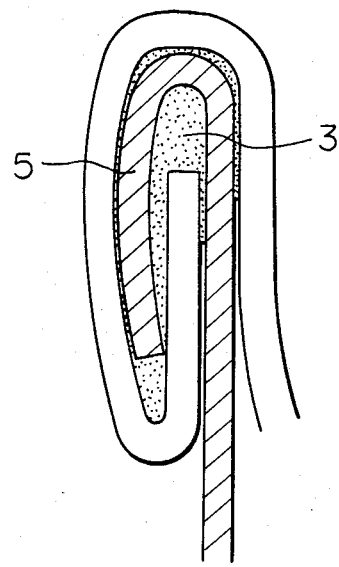
FIG. 2 is a sectional view showing a double-seamed portion of a can end member and a can body.

An electrolyte such as sodium chloride is inevitably contained in an aqueous latex of a styrene-butadiene rubber (hereinafter referred to as "SBR") for adjusting the particle size. When the particle size of SBR particles in the aqueous latex is too small, various disadvantages as described hereinbefore are brought about. Accordingly, it is necessary that an electrolyte should be incorporated as a particle size-adjusting agent for maintaining a particle size of SBR particles beyond a certain level.

The important feature of the present invention is that an alkali metal carbonate or an alkali metal salt of a phosphorus oxyacid is selected as the particle size-adjusting agent from various electrolytes and a composition formed by adding this alkali metal salt in an amount of 0.3 to 2.0 parts by weight per 100 parts by weight of solids of the SBR latex is used as a sealing compound for cans. As is shown in the Example given hereinafter, when a sealing compound comprising a SBR latex and sodium chloride or sodium sulfate as the electrolyte is coated on a surface-treated steel plate in which a steel substrate is scratched, rusting is caused in the scratched portion with the lapse of time and this rusting is conspicuously accelerated under high temperature and high humidity conditions. In contrast, when a sealing compound comprising a SBR latex and sodium bicarbonate, sodium carbonate or sodium phosphate as the electrolyte according to the present invention is similarly coated on a scratched surface-treated steel plate, rusting is not cuased for a long time even under high temperature and high humidity conditions.

Rusting, control of which is aimed in the present invention, takes place when a sealing compound applied to a can end member is allowed to stand in air in the dry state, and this rusting inherently occurs when a SBR latex is formed into a sealing compound by incorporation of other auxiliary components. In other words, when a SBR latex per se is dried and, if necessary, cross-linked to form an elastomer, corrosion of a metal is negligible irrespectively of the kind of the electrolyte. Accordingly, sodium chloride has been used as the electrolyte in many cases. In contrast, the sealing compound of the present invention comprises an emulsifier or a dispersant for improving the dispersion stability of the SBR particles or tackifier in the presence of a larger amount of a filler and a thickener for improving the adaptability to the lining operation, and because of the presence of these moisture-absorbing components, the sealing compound of the present invention is very sensitive to the humidity even after drying and corrosion by the residual electrolyte is significant. It has been found that when an alkali metal carbonate or an alkali metal salt of a phosphorus oxyacid is used as a particle size-adjusting agent for SBR latex particles according to the present invention, the corrosive action of the sealing compound can be prominently controlled even in the presence of moisture-absorbing components in the sealing compound without impairing the inherent particle size-adjusting action of the alkali metal salt.

As the alkali metal carbonate to be incorporated as the particle size-adjusting agent in the present invention, there can be mentioned sodium carbonate, sodium bicarbonate and potassium carbonate, and as the alkali metal salt of the phosphorus oxyacid, there can be mentioned sodium phosphate, sodium pyrophosphate, sodium tripolyphosphate, sodium phosphate and potassium phosphate. Since the SBR latex-based sealing compound is sensitive to the humidity to some extent, in order to attain the objects of the present invention, it is especially preferred that an alkali metal carbonate or bicarbonate is used as the particle size-adjusting agent.

The amount of the alkali metal carbonate or the alkali metal salt of the phosphorus oxyacid to be incorporated in the SBR latex is 0.3 to 2.0 parts by weight, preferably 0.4 to 1.2 parts by weight, per 100 parts by weight of solids of the SBR latex, though this amount is changed to some extent according to the particle size of the SBR particles. When the amount of the particle size-adjusting agent is too little and below the above range, no satisfactory particle size-adjusting effect can be obtained, and if the amount of the particle size-adjusting agent is too much and beyond the above range, the SBR latex-based sealing compound becomes too sensitive to the humidity and the intended objects of the present invention cannot satisfactorily be attained.

In the present invention, it is preferred that the number average particle size of the rubber particles of the SBR latex is 1600 to 3000 ÅA, especially 1800 to 2800 ÅA, though the preferred particle size differs to some extend according to the amount of the alkali metal carbonate or the alkali metal salt of the phosphorus oxyacid. According to the present invention, by using the above-mentioned specific particle size-adjusting agent in the above-mentiond specific amount, there can be obtained a SBR latex which has a relatively large particle size and is excellent in the adaptability to the lining operation, that is, the resistance to the mechanical friction and the action of inhibiting coagulation at a high temperature.

In order to impart an optimal combination of the elastic and plastic properties to the SBR-based sealing compound, it is preferred that in forming SBR, styrene and butadiene should be copolymerized at a weight ratio of from 28/72 to 55/45, especially from 35/65 to 55/45.

It is ordinarily preferred that the latex that is used in the present invention should have a solid content of 40 to 70% by weight and a pH value of 9.5 to 10.5.

The SBR latex that is used in the present invention can be obtained by emulsion-polymerizing styrene and butadiene in an aqueous medium containing the above-mentioned alkali metal carbonate or alkali metal salt of the phosphorus oxyacid in the presence of an emulsifer or a dispersant.

Two kinds of SBR latices, that is, a cold rubber (obtained at a polymerization temperature lower than about 10° C.) and a hot rubber (obtained at a polymerization temperature of 35° to 70° C.), are obtained according to the polymerization temperature. Either the cold rubber or the hot rubber can be used in the present invention. However, since a relatively large amount of a polymerization inhibitor is contained in the cold rubber, if the cold rubber is used, the polymerization inhibitor is included in the sealing compound and is apt to have bad influences on the flavor of the content packed in a can. Accordingly, in the present invention, it is preferred that a hot rubber obtained by carrying out emulsion polymerization at 35° to 70° C. should be used as the SBR latex.

Adjustment of the particle size can be accomplished by increasing or decreasing the amount of the alkali metal carbonate or alkali metal salt of the phosphorus oxyacid. For example, if the amount of such alkali metal salt is increased, the particle size can be increased.

In addition to the above-mentioned SBR latex, the sealing compound of the present invention comprises as indispensable ingredients a tackifier for improving the adhesion to a coating or metal substrate and thus improving the sealing performance, a filler for imparting a good compressive elasticity to the sealing compound and improving the drying property, an emulsifier or a dispersant for improving the dispersion of SBR particles and tackifier in the presence of the filler, and a thickener for improving the adaptability to the lining operation.

As preferred examples of the tackifier, there can be mentioned rosin type resins such as rosin, hydrogenated rosin, rosin esters, hydrogenated rosin esters and hardened rosin, terpene resins, phenol-formaldehyde resins, phenolic resin modified with a natural resin such as rosin or terpene, xylene-formaldehyde resins, modified resins thereof and petroleum resins. The tackifier is used in an amount of 5 to 200 parts of weight, especially 20 to 140 parts by weight, per 100 parts by weight of solids of the SBR latex.

As preferred examples of the filler, there can be mentioned siliceous fillers such as colloidal silica, silicic anhydride, hydrous silicic acid and synthetic silicates, light calcium carbonate, heavy calcium carbonate, activated calcium carbonate, kaolin, calcined clay, alumina white, talc powder, dolomite, aluminum sulfate, barium sulfate, magnesium carbonate, magnesium silicate, magnesium oxide, calcium sulfate, pumice powder, glass powder, asbestos powder, zinc oxide, titanium dioxide and carbon black. The filler is used in an amount of 30 to 200 parts by weight, especially 50 to 150 per 100 parts by weight of solids of SBR latex. As preferred examples of the emulsifier or dispersant, there can be mentioned fatty acids such as oleic acid, stearic acid, palmitic acid, lauric acid and myristic acid, resin acids such as rosin acid, organic sulfonic acids such as alkylaryl sulfonic acids, sulfonic acids of dibasic fatty acid esters and sulfonic acids of aliphatic amides, and sodium, potassium and ammonium salts of these acids. The emulsifier or dispersant is present in an amount of 3.5 to 9.5 parts by weight, especially 4 to 6 parts by weight, per 100 parts by weight of solids of the SBR latex. Since only a relatively small amount of the emulsifier or dispersant is contained in the SBR latex having a relatively large particle size, which is used in the present invention, it is ordinarily preferred that an additional amount of the emulsifier or dispersant is simultaneously incorporated when the tackifier and filler are added to the SBR latex.

Since the viscosity of the sealing compound of the present invention is generally low, from the viewpoint of the adaptability to the lining operation, it is preferred that a thickener composed of a water-soluble polymer is incorporated into the sealing compound of the present invention. As preferred examples of the thickener, there can be mentioned methyl cellulose, hydoxypropylmethyl cellulose, hydroxy ethyl cellulose, carboxymethyl cellulose, sodium alginate, polyvinyl alcohol, sodium polyacrylate and karaya gum. The thickener is preferably used in an amount of 2 to 12 parts by weight per 100 parts by weight of solids of the SBR latex.

Furthermore, other additives such as an antioxidant and a hydrogen ion adjusting agent may optionally be incorporated into the sealing compound of the present invention according to known recipes.

From the viewpoint of the adaptability to the lining operation, it is preferred that the sealing compound of the present invention should have a viscosity of 3000 to 6000 cps (Brookfield viscosity as measured by a rotor #4 rotated at 20 rpm at 25° C.). Adjustment of the viscosity can be easily accomplished by appropriately changing the amount and particle size of the SBR latex and the amount of the thickener.

The present invention will now be described in detail with reference to the following Example that by no means limits the scope of the present invention.

EXAMPLE 1

Composition of Sealing Compound:

| Ingredient | Parts by Weight (PHR) |
| --- | --- |
| SBR Latex (containing 1.0 part by weight of particle size-adjusting agent per 100 parts by weight of rubber solids) | 100.0 |
| Filler (clay and titanium dioxide) | 100.0 |
| Tackifier (rosin type resin) | 80.0 |
| Thickener (methyl cellulose and karaya gum) | 5.0 |
| Emulsifier or dispersant (resin acid soap and fatty acid soap) | 4.5 |
| Antioxidant | 1.0 |
| Water | 435.0 |
| Solid content | 40.0 % by weight |
| pH Value | 10.0 |

Sealing compounds A through F having the above-mentioned composition, containing 1.0 part by weight of the particle size-adjusting agent per 100 parts by weight of the rubber solids and being different in the kind of the particle size-adjusting agent were prepared, and they were tested with respect to the rusting property to the iron surface according to the following accelerated rusting test method.

An epoxy-phenolic lacquer was coated on a commercially available, chemically treated steel plate (Hi-Top supplied by Toyo Kohan Kabushiki Kaisha and having a thickness of 0.22 mm) so that the thickness of the coating after baking was 50 μm, and the resulting coating was baked under predetermined conditions. Then, scratches reaching the iron surface were formed on the coating by using a sharp knife, and a sample of the sealing compound was coated on the scratches so that a compound film having a thickness of 15 to 30 μm was obtained. Then, the coated steel plate was dried at 90° C. for 10 minutes to obtain a test specimen.

The test specimen was allowed to stand under predetermined temperature and humidity conditions, and it was checked whether or not rusting was caused in the scratches. The obtained results are shown in Table 1, from which it will be readily understood that sodium bicarbonate, sodium carbonate and sodium phosphate have a good effect of rusting prevention.

Incidentally, in respect to each sealing compound, 10 specimens were prepared, and the number of the specimens where rusting was observed is shown in Table 1.

TABLE 1

| | | Storage Conditions | | | | | |
| --- | --- | --- | --- | --- | --- | --- | --- |
| | | Temperature of 20° C. and Relative humidity of 75% Storage Period | | | Temperature of 37° C. and Relative Humidity of 83% Storage Period | | |
| Sealing Compound | Particle Size-Adjusting Agent | 5 days | 15 days | 30 days | 5 days | 15 days | 30 days |
| A | sodium chloride | 0 | 7 | 10 | 10 | 10 | 10 |
| B | potassium chloride | 0 | 6 | 10 | 10 | 10 | 10 |
| C | sodium sulfate | 0 | 7 | 10 | 10 | 10 | 10 |
| D | sodium bicarbonate | 0 | 0 | 0 | 0 | 0 | 0 |
| E | sodium carbonate | 0 | 0 | 0 | 0 | 0 | 0 |
| F | sodium phosphate | 0 | 0 | 0 | 0 | 0 | 0 |

What is claimed is:

1. In a can end formed from a surface-treated steel plate having an annular groove at the periphery thereof which comprises a gasket layer formed in the annular groove to seal the double-seamed portion between the can end and a can body, the improvement wherein said gasket layer is formed by lining a sealing compound in the annular groove, said sealing compound comprising as a base component an aqueous latex of a styrene-butadiene rubber which contains styrene and butadiene at a weight ratio of from 28/72 to 55/45, said latex containing as a particle size-adjusting agent an alkali metal carbonate or an alkali metal salt of a phosphorus oxyacid in an amount of 0.3 to 2.0 parts by weight per 100 parts by weight of solids of the styrene-butadiene rubber wherein the number average particle size of particles of the styrene-butadiene rubber is 1,600 to 3,000 Å.

2. The can end as set forth in claim 1 wherein said latex comprises styrene-butadiene rubber particles obtained by emulsion-polymerizing styrene and butadiene at a temperature of 35° to 70° C. in an aqueous medium containing the alkali metal carbonate or the alkali metal salt of the phosphorus oxyacid.

3. The can end as set forth in claim 2 wherein said latex contains the styrene-butadiene rubber particles at a solid concentration of 30 to 90% by weight and has a pH value of from 9.5 to 10.5.

4. The can end as set forth in claim 1 wherein the sealing compound further comprises a thickener composed of a water-soluble polymer in an amount of 2 to 12 parts by weight per 100 parts by weight of solids of the styrene-butadiene rubber.

5. The can end as set forth in claim 1 or claim 4 in which the sealing compound further comprises a tackifier in an amount of 5 to 200 parts by weight, a filler in an amount of 30 to 200 parts by weight and an emulsifier or a dispersant in an amount of 3.5 to 9.5 parts by weight per 100 parts by weight of solids of the styrene-butadiene rubber.

6. The can end as set forth in claim 1 wherein the particle size-adjusting agent is said alkali metal carbonate.

7. The can end as set forth in claim 1 wherein said particle size-adjusting agent is said alkali metal salt of a phosphorus oxyacid.

8. A method for preventing rusting on the cut edge of a can end formed from a surfacetreated steel plate having an annular groove at the periphery thereof which comprises lining a sealing compound comprising as a base component an aqueous latex of a styrene-butadiene rubber which contains styrene and butadiene at a weight ratio of from 28/72 to 55/45, said latex containing as a particle size-adjusting agent an alkali metal carbonate or an alkali metal salt of a phosphorus oxyacid in an amount of 0.3 to 2.0 parts by weight per 100 parts by weight of solids of the styrene-butadiene rubber wherein the number average particle size of particles of the styrene-butadiene rubber is 1,600 to 3,000 Å in the annular groove and double-seaming the can end member to a can body whereby the sealing compound forms a gasket layer in the annular groove to seal the double-seamed portion between the can end and the can body.

9. The method of claim 8 wherein the sealing compound further comprises a thickener composed of a watersoluble polymer in an amount of 2 to 12 parts by weight, a tackifier in an amount of 5 to 200 parts by weight, a filler in an amount of 30 to 200 parts by weight and an emulsifier or a dispersant in an amount of 3.5 to 9.5 parts by weight, per 100 parts by weight of solids of the styrene-butadiene rubber.

* * * * *